(No Model.)
V. J. A. REY.
TYPE PREPARING MACHINE.
No. 561,063.
5 Sheets—Sheet 1.
Patented May 26, 1896.
Fig. I.
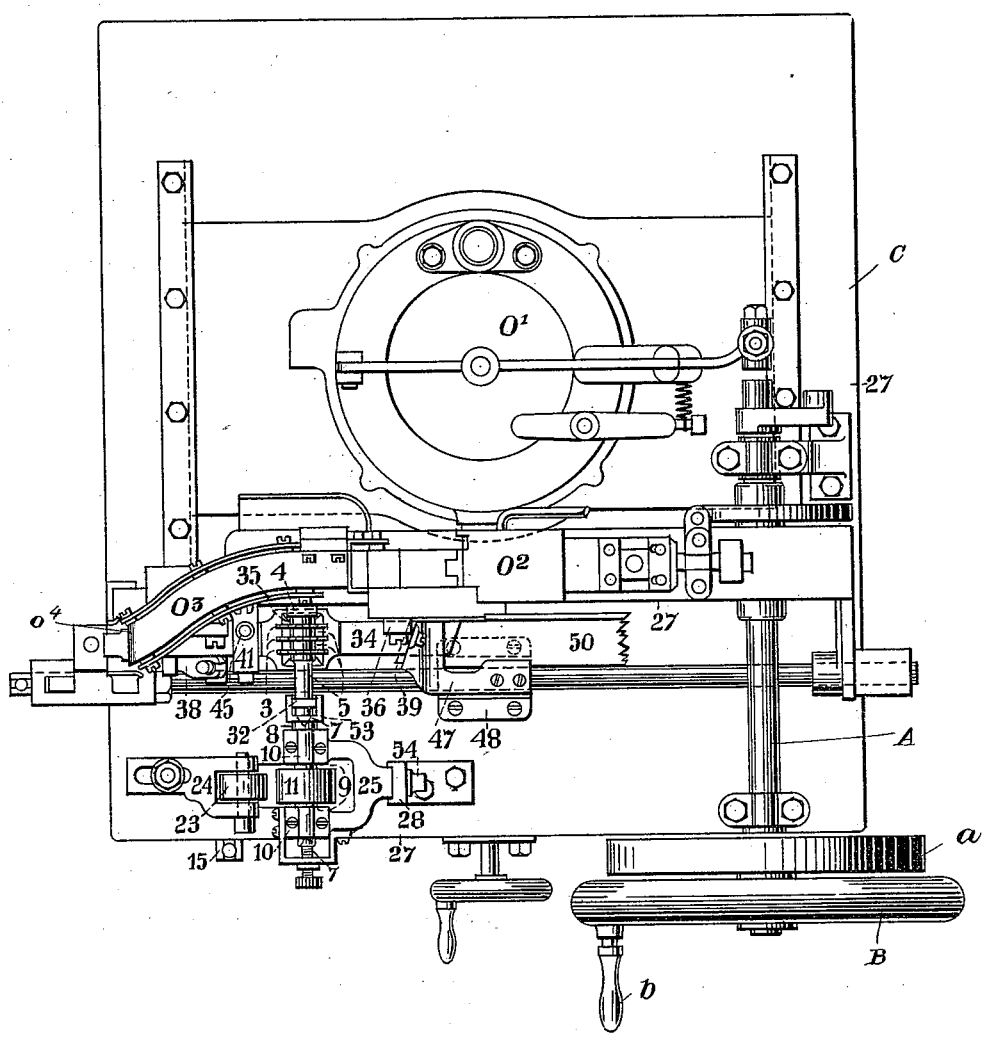
WITNESSES:
E. A. Brandau
Wilson D. Bent, Jr.
INVENTOR:
Valentine J. A. Rey,
PER John Richards
ATTY.

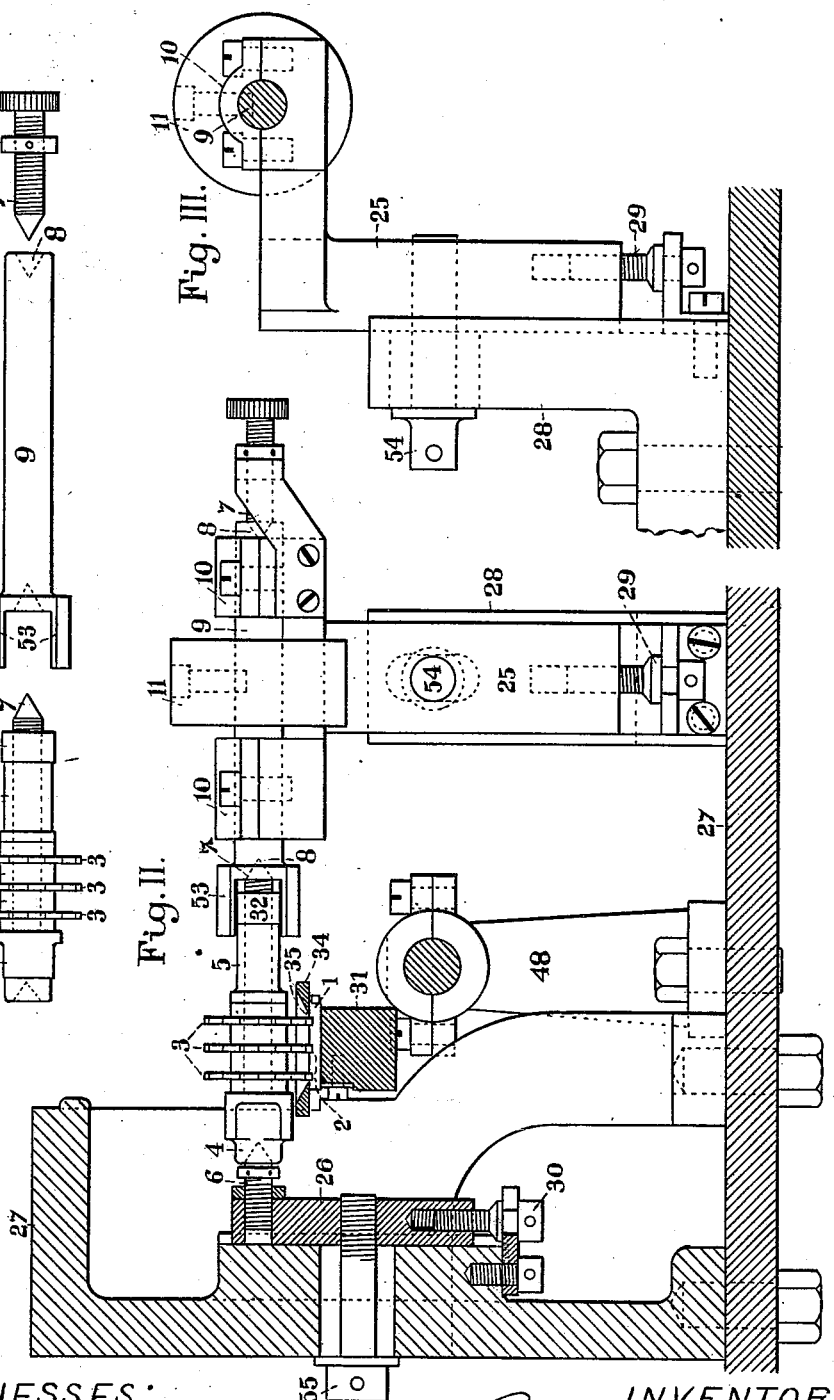

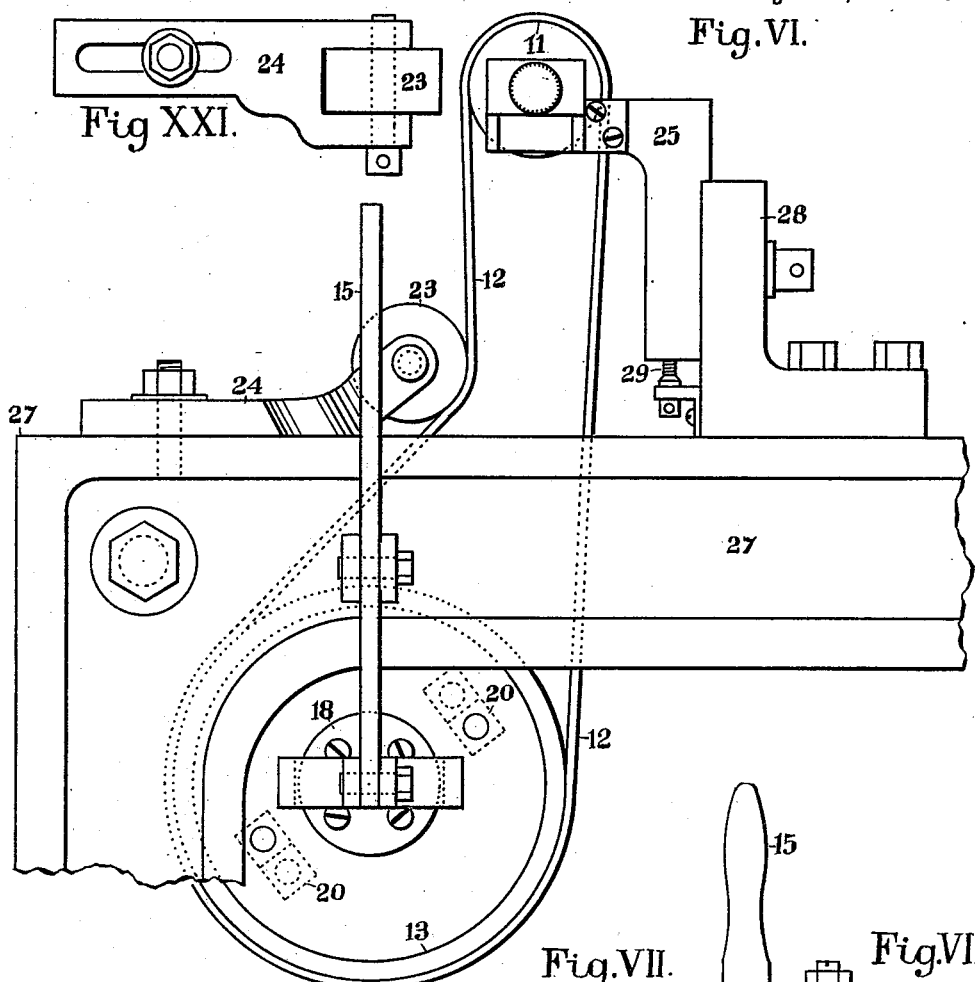

(No Model.) 5 Sheets—Sheet 4.
V. J. A. REY.
TYPE PREPARING MACHINE.
No. 561,063. Patented May 26, 1896.
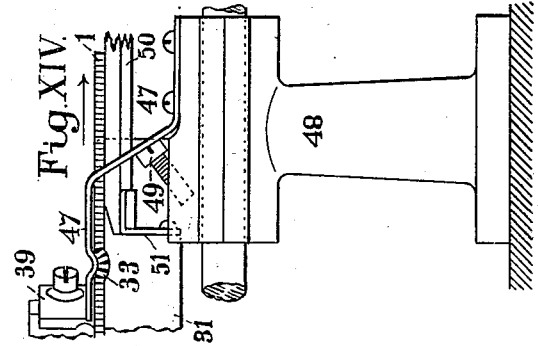
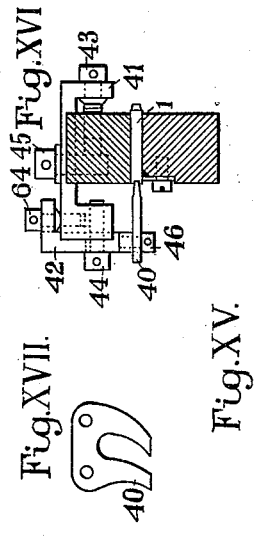
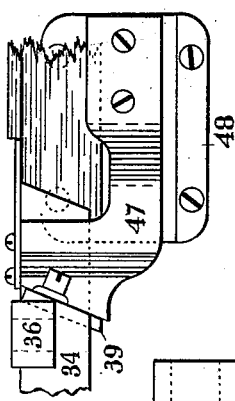
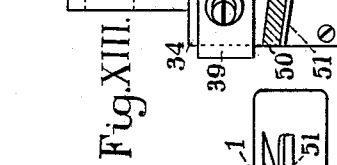
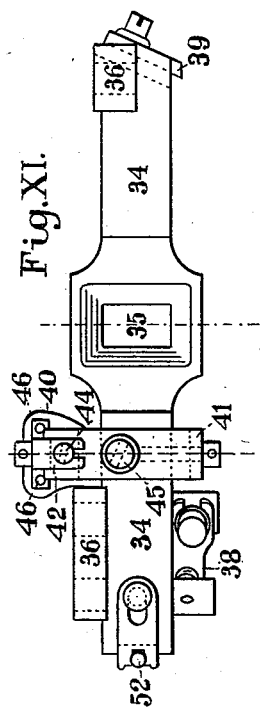
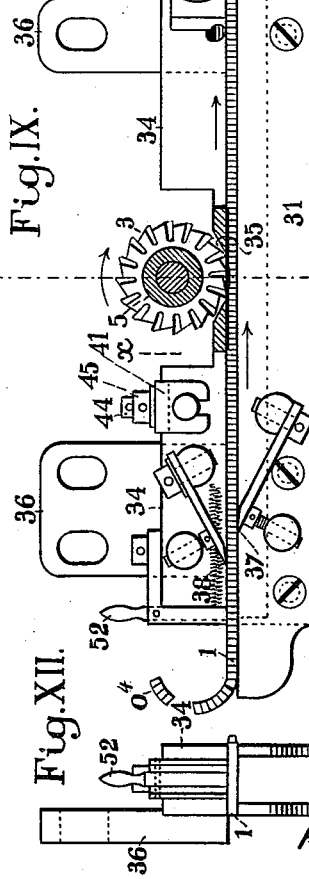
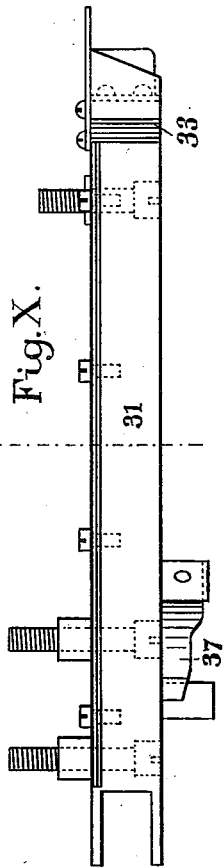
WITNESSES:
E. A. Brandau
Wilson D. Bent Jr.
INVENTOR:
Valentine J. A. Rey
PER John Richard ATTY.

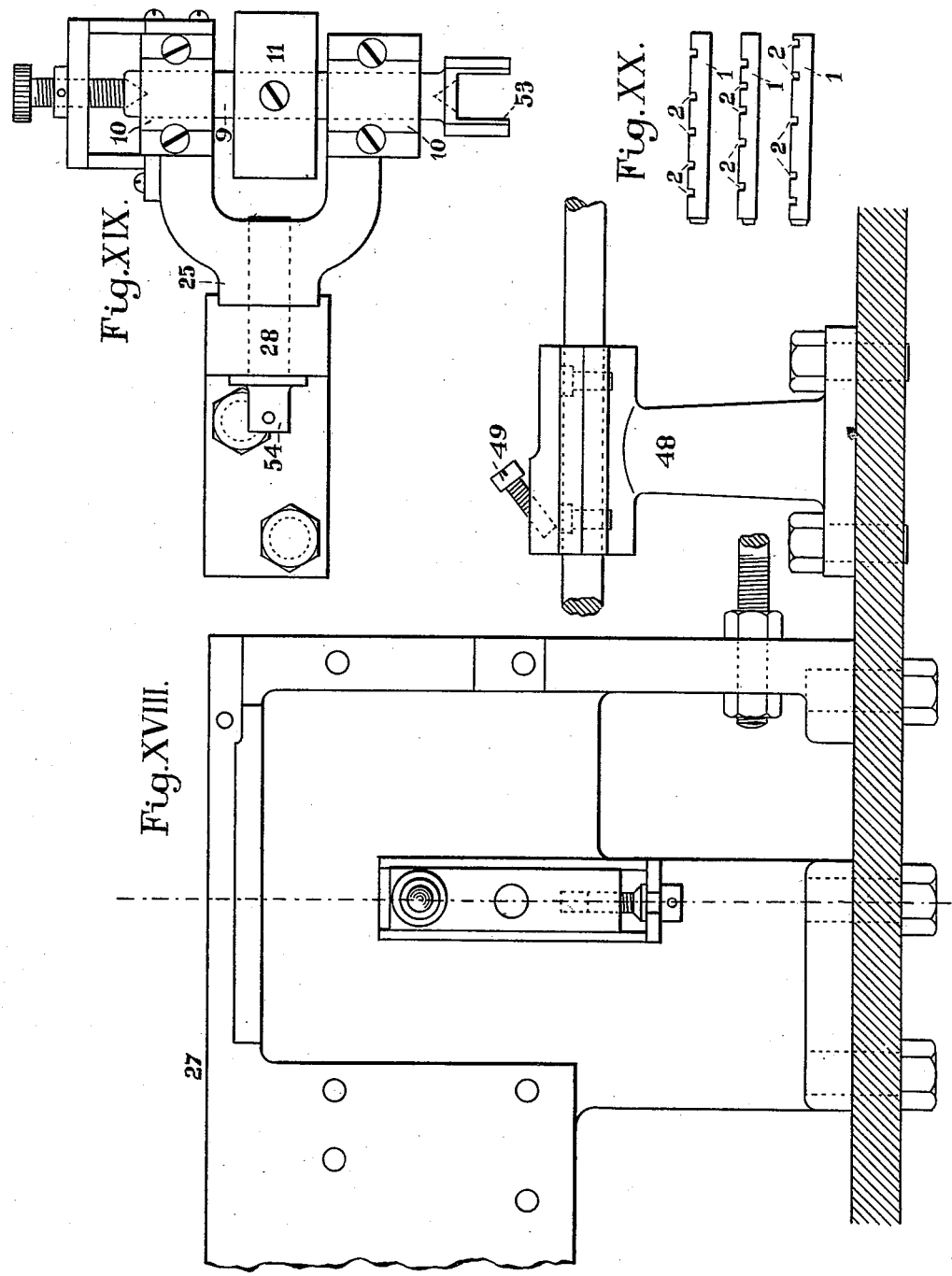

UNITED STATES PATENT OFFICE.

VALENTINE J. A. REY, OF SAN FRANCISCO, CALIFORNIA.

TYPE-PREPARING MACHINE.

SPECIFICATION forming part of Letters Patent No. 561,063, dated May 26, 1896.

Application filed November 15, 1894. Serial No. 528,910. (No model.)

*To all whom it may concern:*

Be it known that I, VALENTINE J. A. REY, a citizen of the United States, residing in the city and county of San Francisco, State of California, have invented certain new and useful Improvements in Type-Making or Type-Preparing Machinery; and I hereby declare the following specification and the drawings therewith to constitute a complete description of my improvements and the method of employing the same.

My invention relates to the preparation of printing-type for use in type setting and distributing machines, and to cutting the nicks or notches whereby selection and distribution are determined in this class of machinery.

My improvements consist in applying to type-casting or type-making machines mechanism for cutting registering notches in the side or sides of the type at accurately-determined spaces, longitudinally, of uniform depth and width, by means of rotary saws or milling-tools mounted on a spindle set transversely to the course of the type as it issues from the type-making machines, or in any other similar manner, the distances between, depth of the notches, their width and relation to the registering ends of the type being absolute when the machine is adjusted.

The objects of my invention are to secure accuracy, which is essential to the perfect working of type setting and distributing machines, to secure rapid performance of the cutting implements without strain on the type, to prevent separate handling or separate attention for nicking or notching the type, and to facilitate, perfect, and complete the manufacture of type in one machine and at one operation.

In the distribution of type by machinery the common method is to perform selection by notches in the side or sides of the body or stem, such notches being sufficient in number to permit permutation by position, so that each letter or character has a distinct contour on its notched side, and thus will only enter a matrix or cell having a corresponding contour or shape. Such notches not only have to be made with great accuracy as to form and position and accurately-computed distances from each other, but uniform as to continued manufacture over long periods from records or gages. Hence the adjustment and wear of tools for cutting such notches should be provided for in the most complete and effective manner, and to attain these ends I employ rotary implements that may be arranged as an integral part of type-making machines, or may be operated independently, as set forth, and shown in the drawings herewith, which show my invention as applied in practice.

The primary element involved in my invention is a row of uniform type issuing from any kind of a type-making machine, or from a stock of type disposed in rows and moved or fed forward continuously, as will now be described.

Referring to the drawings, Figure I is a plan view of a type-making machine with some of its details omitted, showing how my improvements are attached or applied to such machines. Fig. II is an elevation, partially in section, of the cutting-spindles for nicking or notching the type, its supports, and part of the main frame of a type-making machine, on which these details are mounted. Fig. III is a view at right angles to Fig. II of the outer or main bearing of the cutter-spindle, showing the method of adjustment vertically. Figs. IV and V show the cutter-spindle, the driving-spindle, and one pivot detached. Fig. VI shows in side view the driving mechanism for operating the cutter-spindle. Fig. VII is a section through a clutch for stopping and starting the cutter-spindle, and Fig. VIII is a detail of the same. Fig. IX is a side view of the bed or main member of the apparatus detached from the type-making machine. Fig. X is a partial plan view of Fig. IX. Fig. XI is also a plan view of the main bed as shown in Fig. IX. Fig. XII is an end view of Fig. IX from the left. Fig. XIII is an end view of Fig. IX from the right. Fig. XIV is a partial view of the bed or main member, showing the traveling device or guide with a breaking attachment at its end to separate the type from each other, and which is an essential part of the device. Fig. XV is a plan view of Fig. XIII. Fig. XVI is a section through Fig. IX on the line $x\,x$. Fig. XVII is a detail of Fig. XVI. Fig. XVIII is a front view of a portion of a type-making machine where my improved apparatus is mounted, showing the method of supporting and adjusting the inner end of the cutter-spindle. Fig. XIX is a plan view of the arbor and its bearings for supporting the driving-spindle. Fig. XX is an enlarged side view of some type, showing the notches or nicks prepared by my improved machinery. Fig. XXI is a plan view of the tension-pulley for the cutter-spindle belt.

Similar numerals and letters of reference are employed to designate corresponding parts in the various figures of the drawings.

Referring first to Fig. I, this shows a plan view of a common type-casting machine, O' being the melting-pot from where the melted metal flows into molds or dies beneath the plate O². C denotes the main frame of such a machine. A indicates the driving-shaft, which is mounted on suitable bearings on said frame. On this shaft is a drive-pulley $a$ and a crank-wheel B, having a crank-handle $b$. The type when firm pass out in continuous rows on the runway O³ and descend over the end of this runway O³, which is curved downward at O⁴, the type following around this curved end, and are reversed in their course, so as to pass back, as shown in Fig. IX, under the plate or guard 34, and after being notched by the cutters 3 are led out into the stick 50 to be removed for packing or use.

Referring next to the parts that especially constitute my invention, Fig. XX shows in side view machine-type 1 having notches 2, such as it is the purpose of my invention to prepare. These notches are varied in their number or relative positions, so as to by selection pass laterally into chambers having corresponding ledges that fit the notches 2 in the type. These notches 2 I form in the type by means of rotary cutters or saws 3, mounted on a spindle 4, and spaced for distance and held between by collars 5 and a collar-nut 32, as shown in Fig. IV. The spindle 4 is supported at its ends by an adjustable pivot-screw 6 at the inner end and a point-screw 7, fitting into a seat 8 in the end of the driving-spindle 9. The forks 53 fit over flattened sides on the nut 32 to drive the cutter-spindle 4, as seen in Fig. II. This spindle 9 with the cutter-spindle 4 is thus moved inward or outward by these screws 6 and 7, adjusting the saws 3 laterally in respect to the length of the type 1. The driving-spindle 9 moves slightly longitudinally in its bearings 10 to accommodate the adjustment just described, and is driven by a pulley 11 and belt 12, passing around the pulley 13, which is in turn driven by the pulley 14, connected with the rotary elements of a type-making or type-feeding machine, the pulley 13 being stopped and started by the clutch seen in Fig. VII. This clutch is operated by a lever 15, that operates a yoke 16 and a collar 17, fitting loosely around the hub 18 of the pulley 13, so as to move the latter sidewise on the stud 19, and thus engage the jaws 20. As, however, such engagement would cause a shock and sudden starting, a frictional device is provided, consisting of a conical hub 21 on the pulley 14 and a corresponding matrix or shell 22 on the hub of the pulley 13, which engage before the jaws 20, and thus set the pulley 13 gradually into motion or without shock. The tension of the belt is regulated by the pulley 23, mounted on an adjustable bracket 24, bolted to the main frame 27 of the type-making machine, as seen in Figs. I and VI. The vertical adjustment of the driving-spindle 9 and the cutter-spindle 4 to regulate the depth of the notches 2 and to accommodate type of different sizes is performed by means of the movable brackets or supports 25 and 26, both attached to the main frame 27, as seen in Figs. II and III, the former moving vertically on the bracket 28 by means of an adjusting-screw 29, and the latter by means of the screw 30, these brackets being clamped and held by the screws 54 and 55, as shown in Fig. II. In this manner it will be seen the cutters or saws 3 can be adjusted vertically or laterally and held at any point, and such adjustment in combination with the distance-collars 5 enables notches 2 to be formed in the sides of the type 1 at any desired position, number, or relation.

The type 1 come from the casting and forming machine or from any other feeding device in a continuous row, as seen in Fig. IX, and pass on to a platen or bed 31. To hold the type 1 down on the table 31 while being acted upon by the cutters 3, I provide a platen 34, having a perforation 35, as seen in Figs. IX and XI. This platen 34 is of a square section at the ends, as shown in Figs. XII and XIII, and cut away in its middle section to admit the cutters 3, as seen in Fig. IX, and is provided with lugs 36, by means of which it is attached to the side of the type-making machine or other suitable frame. The platen or guard 34 is provided with adjustable cutters or trimming implements 37 and 38 for the letter ends and a wide diagonal cutter 39 for the top edges, the latter especially to trim off any inequalities produced by the saws 3. Otherwise these trimming implements are common to type-making machines and do not constitute a part of my invention. There is also provided a plane or cutter 40, having two edges, as shown in flat view at Fig. XVII. This cutter 40 is mounted on the adjustable slides or brackets 41 42 and attached to the latter by screws 46, as seen in Figs. XI and XVI. The slides or brackets 41 42 are moved by the screws 43 44 and held when adjusted by the screws 64 45. The object of this cutter 40 is to cut away the break or sprue where the metal ran into the type-mold. In the face of the bed or platen 31 I form a concave or curved depression 33, into which type 1 are pressed by a spring 47, in this case shown as attached to a bracket 48, which is a part of a type-casting machine, a screw 49 being provided to adjust the pressure of the spring 47, as shown in Fig. XIV. The object of these last-named devices is to cause the type 1 to be separated, as seen in Figs. IX and XIV, and thus break cohesion arising from the action of the cutters 3, so the type will be loose when completed. This last-named operation completes the type, which then pass off the bed or platen 31 to a stick 50 in the usual manner. This stick 50 is set transversely in a slightly-diagonal position, as shown in Fig. XIII, and is held at the inner end by a bracket 51, as shown in Fig. XIV.

The handle 52, mounted on the bar 34 and seen in Fig. IX, is to operate a pressing-spring to hold and guide the type as it comes from a type-casting machine, and is not an essential portion of the apparatus included in my invention.

Having thus described the nature and objects of my invention and the manner of applying the same in practice, what I claim, and desire to secure by Letters Patent, is—

1. In a type-preparing machine, a platen or table on which the type move, and a guard or bearing bar to hold the type down on the platen, and in combination therewith rotary saws or cutters to form registering notches in the type, mounted adjustably on a spindle set transversely to the table and guard, and adjustable vertically and longitudinally in respect thereto, in the manner substantially and for the purposes specified.

2. In a type-preparing machine, an adjustable spindle provided with cutters or saws to cut registering notches in the type, in the manner described; a bed or platen on which the type move, and a depression therein around which, or into which, the type pass, so as to loosen and separate them after the action of the saws or cutters, in the manner substantially as described.

3. In a type-preparing machine, a rotary spindle on which is placed a series of saws, said saws being laterally and vertically adjustable; a platen or bed on which the type are moved, a depression therein whereby the type are canted and separated after being notched, and over this depression in the platen a spring or pressure bar that forces the type down, and causes them to follow the contour of the platen or table, in the manner substantially as described.

4. In a type-preparing machine, the combination of a spindle which is vertically and longitudinally adjustable, a series of cutters or saws on the spindle, the distance-collars for laterally adjusting the saws on the spindle, together with the sleeve and screw-nut, a driving-spindle in alinement with said spindle, said spindle being also adjustable laterally and longitudinally, a platen or bed on which the type are moved, and a guard which bears down on the type, substantially as described.

5. In a type-preparing machine, the combination of a spindle, which is vertically and longitudinally adjustable, a series of adjustable saws thereon, a bed or platen on which the type move, a superimposed guard or guide to hold the type down, adjustable trimming implements on said guard, and a diagonal cutter for removing inequalities from the type produced by the saws, substantially as decribed.

6. In a type-preparing machine, the combination of a spindle, which is vertically and longitudinally adjustable, a series of adjustable saws thereon, a bed or platen on which the type move, a superimposed guard or guide to hold the type down, adjustable trimming implements on said guard, and a diagonal cutter for removing inequalities from the type produced by the saws, and a two-edged cutter mounted in slides or brackets to cut away the break where the metal runs into the type-mold, substantially as described.

7. In a type-preparing machine, the combination with type-casting mechanism, a type-supporting platen, and a guard for holding the type on the platen, of a rotary spindle, the saws mounted thereon, a driving-spindle for the aforesaid spindle, a vertical slide for adjusting the first spindle, another vertical slide for adjusting the driving-spindle, and clamping means for the slides, substantially as described.

In testimony whereof I have hereunto affixed my signature in the presence of two witnesses.

VALENTINE J. A. REY.

Witnesses:
ALFRED A. ENQUIST,
WILSON D. BENT, Jr.